(12) United States Patent
Keski-Luopa (10) Patent No.: US 7,908,834 B2
(45) Date of Patent: Mar. 22, 2011

(54) GRASS CUTTING UNIT

(75) Inventor: Mauno Keski-Luopa, Lahti (FI)

(73) Assignee: Actioneco Oy, Lahti (FI)

( * ) Notice: Subject to any disclaimer, the term of this patent is extended or adjusted under 35 U.S.C. 154(b) by 0 days.

(21) Appl. No.: 12/297,086

(22) PCT Filed: Apr. 13, 2007

(86) PCT No.: PCT/FI2007/000097
§ 371 (c)(1),
(2), (4) Date: Apr. 10, 2009

(87) PCT Pub. No.: WO2007/118925
PCT Pub. Date: Oct. 25, 2007

(65) Prior Publication Data
US 2009/0211216 A1    Aug. 27, 2009

(30) Foreign Application Priority Data

Apr. 13, 2006 (FI) ..................................... 20060363

(51) Int. Cl.
*A01D 34/00* (2006.01)
*A01D 34/54* (2006.01)
(52) U.S. Cl. .......................... 56/17.2; 56/249
(58) Field of Classification Search .................. 56/17.1, 56/17.2, 249, 255, 251, 294, 10.2 R, 10.2 D, 56/10.4
See application file for complete search history.

(56) References Cited

U.S. PATENT DOCUMENTS

| | | | |
|---|---|---|---|
| 1,095,097 A | 4/1914 | Fournet | |
| 3,099,124 A | 7/1963 | Strasel | |
| 5,203,151 A | 4/1993 | Mills | |
| 7,377,092 B2 * | 5/2008 | Schmidt et al. | ................. 56/249 |
| 2004/0216439 A1 * | 11/2004 | Poulson et al. | ................. 56/249 |

FOREIGN PATENT DOCUMENTS

EP    1495661    1/2005

OTHER PUBLICATIONS

International search report in corresponding PCT/FI2007/000097.

* cited by examiner

*Primary Examiner* — Robert E Pezzuto
(74) *Attorney, Agent, or Firm* — Young & Thompson (57) ABSTRACT

A grass cutting unit (1) includes a frame (2) and, provided in connection with the frame: a cutter (3) for cutting grass and support elements (4; 41, 42) for supporting the cutting unit (1) against the ground, particularly when cutting grass. The cutting unit (1) is provided with a cutting height setting device. In a most preferred embodiment of the invention, the cutting height setting device includes two lead screws (7; 71, 72; 73, 74) that are connected to the ends of both support reels (4; 41, 42), and the corresponding nut elements are connected to the frame; by rotating the lead screws by driving motors, advantageously electric motors (6; 61, 62), each support reel can be moved essentially in the vertical direction, and simultaneously the cutting height can be adjusted within the desired limits.

20 Claims, 5 Drawing Sheets

GRASS CUTTING UNIT

BACKGROUND OF THE INVENTION

The invention relates to a grass cutting unit

DESCRIPTION OF THE RELATED ART

In the prior art there is known, from the patent publication U.S. Pat. No. 5,203,151, a grass cutting unit including a cutting reel and a ground reel, both arranged in a frame, the purpose of said ground reel being to define the suitable height-of-cut for the grass. The reel of the cutting unit is at both ends fastened rotatably to a roller support. Both roller supports are provided with a screw and at the end of said screw with a hand wheel for rotating the screws and for adjusting the cutting height. The mutually facing surfaces of the hand wheel and the end part of the roller support are made uneven, so that the rotating of the hand wheel is prevented and the cutting height is locked, when the hand wheel and the end part of the roller support are in mutual contact. Both roller supports, particularly the screws fitted therein, are connected to the cutting unit frame by a strut and a nut element provided with a threaded hole for the screw. When the hand wheel and the screw are lifted, the surfaces of the hand wheel and the end part of the roller support are separated from each other, so that the rotating of the hand wheel and at the same time of the screw, as well as the shifting of the nut element and the adjusting of the cutting height becomes possible.

In the cutting unit described above, the adjusting of the cutting height is realized as manually performed adjustments that are directed separately to both ends of the roller support. The problem is that the adjusting must be carried out manually, either in connection with maintenance, or at least before cutting the lawn. Another drawback is that the adjusting process is cumbersome and hard to realize. When the hand wheel is lifted for performing the adjustment, it is necessary to simultaneously lift the screw, the nut element and the connected cutting unit frame and cutting reel. Yet another problem is the adjusting accuracy. Both ends of the roller reel must be adjusted at the same height with respect to the ground surface and the cutting blade, which may in practice be surprisingly troublesome and time-consuming. The heights of the ends must be measured manually for ensuring that the roller support and the cutting blades are aligned in parallel, and also at the desired height. It should also be pointed out that the above described problems are emphasized, in case the grass cutting device includes several cutting units.

In the prior art there is known, from the patent publication EP-1474962-A1, a reel-type grass cutting unit provided with an adjusting arrangement for setting the cutting height. The cutting unit comprises two frame elements, i.e. an inner and an outer frame element. The cutter formed of a cutting reel and a counterblade is attached to the inner frame element. Two support reels, by which the cutting unit is supported against the ground when cutting grass, are arranged, when observed in the proceeding direction, at the front and rear sides of the cutter, which in turn are attached to the outer frame element. In between the frame elements, there are arranged two actuators at the opposite ends of the cutting unit. By means of said actuators, the distance of the frame elements and also of the cutter from the ground can be set to be suitable, and thus the cutting height of the cutter can be adjusted. In addition, in between the frame elements there are arranged support struts, by means of which the setting of the distance can be realized as an essentially straight, vertical motion. Moreover, the attack angle of the cutter can be adjusted, so that the cutter can, by means of other actuators, be rotated with respect to the support point in the first frame. The actuators are realized by means of stepper motors and lead screws.

The problem with known cutting unit adjusting arrangements arises from their complicated mechanical solutions. This means that the cutting units must be maintained fairly often, in order to make the adjusting arrangement work appropriately. The cutting unit frame elements that are reciprocally movable collect on their moving surfaces and seam joints clippings that must be removed relatively often by suitable cleaning operations.

SUMMARY OF THE INVENTION

The object of the invention is to eliminate the problems connected to the above described cutting units and their adjusting arrangements. Another object of the invention is to realize a novel grass cutting unit that is suited to be used particularly as the cutting unit of driven devices meant for cutting grass, the cutting height of which unit can be easily set as desired.

A grass cutting unit according to the invention comprises a frame and, provided in connection with said frame: a cutter for cutting grass and support elements for supporting the cutting unit against the ground, particularly when cutting grass, said cutting unit being provided with a cutting height setting device comprising a number of lead screws that are functionally fitted in between the frame and the support elements. According to the invention, the cutting height setting device includes at least one driving motor, a number of nut elements in connection with the frame and the lead screws, and power transmission means in between one or several driving motors and the nut elements, said driving motor being connected, by intermediation of suitable power transmission means, to the nut elements operating the lead screws of the support elements, so that by rotating the lead screws by the driving motor, the position of the support elements with respect to the cutter, as well as the cutting height, can be adjusted within the desired limits.

It is an advantage of the invention that the cutting unit is simple in structure. Most advantageously the lead screws are arranged directly in between the cutting unit frame and the support elements. Another advantage of the invention is that the cutting unit frame is realized of essentially one piece, in connection with which all the functional elements of the cutting unit are arranged. Thus neither any reciprocally movable frame elements nor lever or spur arrangements are necessary.

In a preferred embodiment of the invention, each nut element is rotatably attached by a suitable fastening element, such as a fastening sleeve, above the frame support elements. The fastening element, such as a fastening sleeve, allows the rotation of the nut element, but prevents it from moving in the direction of the lengthwise axis of the lead screw. In particular, a fastening sleeve is a simple and functionally secure fastening element.

In a preferred embodiment of the invention, the power transmission means are realized as endless power transmission means, such as a belt or a chain, and by means of swivel wheels fitted in connection with nut elements. The advantage is that now the power transmission is arranged flexibly and variably for cutting units of different sizes. Another advantage is that the arrangement is simple and easily maintained, and when necessary, worn power transmission means can be replaced by new corresponding elements.

In a preferred embodiment of the invention, the cutting height setting device also includes a control unit provided with a cutting height setting unit, in which the desired grass cutting height can be fed, and which unit performs the setting of the cutting height of the cutting unit by adjusting the position of the support elements by means of driving motors, by using nut elements and lead screws. Most advantageously the control unit is realized by means of a suitable micro control or the like. An advantage of this kind of control unit is that it can be suitably programmed for selecting and setting the cutting height. Another advantage is that the desired cutting heights can be easily and directly selected by intermediation of the control unit, by suitable feed elements, such as selecting switches, keys or a touch-sensitive screen. Yet another advantage is that the set value of the cutting height can be altered when necessary when driving, for instance when proceeding form one grass area to another, with a different grass quality and different grass height requirements.

In a preferred embodiment of the invention that is suited in a cutting unit where the first support elements are arranged, when observed in the proceeding direction, at the front side of the cutter, and the second support elements are arranged at the rear side of the cutter, the lead screws are arranged in two groups, i.e. in first and second lead screws, of which the first lead screws are connected to the first support elements and the second lead screws are connected to the second support elements, and the cutting height setting device comprises one driving motor that is connected, by intermediation of power transmission means, to the first and second nut elements operating the lead screws of the first and second support elements.

An advantage of the above described embodiment of the invention is that it can be applied both in cutting units provided with reel-type, horizontally rotating cutters, and in cutting units provided with blade-type cutters rotated on a plane with respect to a vertical axis. Yet another advantage of this application is that the cutting unit is made relatively light in weight and easy to adjust.

The above described embodiment of the invention is advantageous to realize so that the transmission ratio of the power transmission means is different between the driving motor and the first nut elements of the first lead screws of the first support elements, and respectively between the driving motor and the second nut elements of the second lead screws of the second support elements. By means of this arrangement, the rotation speeds of the first and second lead screws and simultaneously the climbing speeds and distances per unit of time are made to differ. Depending on the transmission ratios, either the first or second lead screws rotate faster, and respectively the support elements connected thereto are transferred fasted in the desired direction, either upwards or downwards, and thus they also travel a longer distance per time unit. When the transmitted distance of the first and second support elements per time unit differ, also the position of the cutting unit changes with respect to the ground surface. Thus the attack angle of the cutting unit is at the same time adjusted in a predetermined way by changing the transmission ratio.

In the most advantageous variation of the above described embodiment of the invention, the transmission means are realized as endless power transmission means, such as a belt or a chain, by using swivel wheels fitted in connection with the nut elements, and so that the diameter of the swivel wheel of the first nut elements of the first lead screws of the first support elements and the diameter of the swivel wheel of the second nut elements of the second lead screws of the second support elements are difference in size. Thus the first transmission ratio between the driving motor and the first lead screws is defined by the ratio between the diameter of the swivel wheel, preferably a cogged wheel, of the driving motor, and the diameters of the swivel wheels provided in connection with the nut elements of the first conveyor wheels, and respectively the second transmission ratio between the driving motor and the second lead screws is defined by the ratio between the diameter of the driving motor swivel wheel, preferably a cogged wheel, and the diameters of the swivel wheels provided in connection with the nut elements of the second conveyor wheels. When the diameters of the swivel wheels provided in connection with the nut elements of the first and second conveyor wheels are different in size, the transmission ratio between the first and respectively second lead screws of the driving motor also is different.

In an alternative embodiment of the invention that utilizes only one driving motor, the first and second lead screws are provided with different angles of thread. In this case the lead screws are rotated at the same speed, but owing to the different thread angles, the climbing speeds and distances per time unit of the first and second lead screws are different.

In a preferred embodiment of the invention that is suited in a cutting unit where the first support elements are arranged, with respect to the proceeding direction, at the front size of the cutter, and the second support elements are arranged at the rear side of the cutter, the cutting height setting device comprises two driving motors, of which the first driving motor is connected, by intermediation of first power transmission means, to the first nut elements operating the first lead screws of the first support elements, and respectively the second driving motor is connected, by intermediation of second power transmission means, to second nut elements operating the second lead screws of the second support elements.

It is and advantage of the above described embodiment of the invention that the first and second support elements can be adjusted separately. The distance of the front part and respectively the rear part of the cutting unit from the ground surface can be suitably set by adjusting the support elements, and thus the attack angle can be simultaneously adjusted completely freely, irrespective of the cutting height. Thus the cutter can be set at a small angle with respect to the ground surface, by adjusting the relative distance of the first and respectively second support elements from the ground surface. Thus the cutting result of the cutting device can be improved.

In a preferred embodiment of the invention, the control unit is provided with an attack angle setting unit, in which the desired attack angle can be fed and which performs the setting of the attack angle by adjusting the relative position of the first and second support elements by means of the driving motors and by operating the lead screws. Another advantage is that the desired attack angles of the cutting unit, for instance for different cutting heights, can be selected easily and directly by intermediation of the control unit, by suitable feed elements, such as selecting switches or keys. As an alternative, the attack angle of the cutting unit is automatically selected according to the cutting height, for instance from a cutting height-attack angle table recorded in the memory of the control unit.

In a preferred embodiment of the invention, the control unit is provided with a cutting height calibration unit, by means of which a reference height is set in the memory of the control unit, said reference height corresponding to a given predetermined cutting height in a given position of the transmission motors. The advantage is that there is not needed any particular device for measuring the cutting height. By means of simple, quick and effective calibration that is realized for instance when starting the cutting of a large lawn, such as a golf course, there are ensured accurate cutting heights according to the cutting height requirements set for the difference grass areas.

The above described embodiments of the invention are particularly suited in a cutting unit where the cutter has a reel-like, essentially horizontally rotated cutting reel and a counterblade, and where the first and second support elements comprise a support reel having essentially the same length as the cutting unit, said support elements being aligned, in the proceeding direction, at the front and rear sides of the cutter, essentially in parallel therewith. According to this embodiment, the first lead screws are connected to the ends of the first support reel, and respectively the second lead screws are connected to the ends of the second support reel, and the corresponding nut elements are connected to the frame, and by rotating said lead screws, each support reel is movable essentially vertically.

A remarkable advantage of the above described embodiment of the invention is that the cutting unit and particularly the cutter can be set, by means of the support reels, at a suitable distance from the ground surface, and thus the cutting height can be set at a suitable level with respect to the ground surface. Another advantage is that the support reels are separately adjustable, which results in that the attack angle of the cutter can also be suitably set by adjusting the relative distance of the support reels from the ground surface. Thus any separate device for setting the attack angle is not necessarily needed. The attack angle is advantageously adjusted to be suitable according to the cutting height and the grass to be cut, and the quality of the cutting can thus be improved.

In a preferred embodiment of the invention, the driving motor is realized as an electric motor, particularly an electrically driven servo motor. Adjusted feedback motors are called servo motors. Electrically driven servo motors are direct current (DC) or alternating current (AC) motors that are integrated as part of the control and adjusting system of the target of usage, in this case the cutting unit. It is an advantage that the data related to the axis position and rotation speed of a servo motor is obtained directly from the motor to the adjusting unit, whereby the lead screw position and accordingly the cutting height of the cutting unit are directly readable, and respectively the fed, preset value of the cutting height can be achieved. There is not needed any separate measuring sensor for defining the cutting height. Another advantage is that by using the servo motor, there is measured and adjusted the cutting height, in principle continuously, and the cutting height is maintained at the preset value. It is a particular advantage that there is not needed any separate mechanical locking device for the lead screw and/or the nut element.

BRIEF DESCRIPTION OF THE DRAWINGS

The invention is described in more detail with reference to the appended drawings, where.

DESCRIPTION OF THE PREFERRED EMBODIMENTS

Like reference numbers for like parts are used in the drawings.

The device for cutting grass comprises a frame that is moved supported by wheels or the like, in connection with which there are provided means for moving the device, for instance an electric motor with a battery, and the control elements of the device. In the frame, there is arranged a cutting device for cutting grass, said device including a number of cutting units. The cutting units are preferably arranged adjacently, but they can also be arranged in an overlapping fashion or in succession, depending on the size of the device and the number of the cutting units, so that a stretch of grass that is as wide as possible can be cut evenly and universally when moving the device forward.

The invention relates to a grass cutting unit 1 that is advantageously suited to be used as the cutting unit of the above described device. The cutting unit 1 comprises a frame 2, a cutter 3 for cutting grass and support elements 4 for supporting the cutting unit 1 against the ground, particularly when cutting grass. The cutter 3 and the support elements 4 are arranged in connection with the frame 2. In addition, the cutting unit 1 is provided with a cutting height setting device.

The support elements 4 are for instance discs, wheels, rollers or the like, rotating freely around their axis, being suitably attached in connection with the frame 2 of the cutting unit 1, on different sides thereof, so that they extend to below the frame. Generally the support elements 4 of the cutting unit 1 are arranged in two groups, in the first of which the support elements 41 are arranged, in the proceeding direction, at the front side of the cutter 3, and in the second group the support elements 42 are arranged at the rear side of the cutter. The support elements 4 are arranged to support the cutting unit 1 against the ground when cutting grass, and thus when using the cutting unit. By means of the support elements 4, there is defined the grass cutting height, i.e. the height of the grass or lawn in which it should be cut by the cutting unit 1.

The cutting height setting device comprises at least one driving motor 6 and a number of lead screws 7 that are fitted in between the frame 2 of the cutting unit 1 and the support elements 4; 41, 42. The driving motor 6 is connected, by intermediation of suitable power transmission means 9, to the nut elements 8 operating the lead screws 7 of the support elements 4; 41; 42. By rotating the nut elements 8 by the driving motor 6, the position of the support elements 4, particularly their support position, i.e. the position of their underside surface with respect to the cutting level of the cutter 3, in this case particularly with respect to the counterblade 32, can be adjusted, and at the same time said distance, i.e. the cutting height h (cf. FIG. 4) is adjustable within the desired limits, i.e. between the maximum and minimum height values.

The lead screw 7 is operationally connected to the support element 4. It is now connected either directly or through a suitable connecting element to the support element 4. The connecting element can be a lever mechanism, as the result of which the lengthwise axis of the lead screw is positioned at an angle with respect to the vertical direction. In a preferred embodiment, the lead screws 7 are fitted essentially vertically in between the frame 2 of the cutting unit 1 and the support elements 4; 41, 42, in which case the structure is simple, light and secure in operation.

The lead screws 7 are preferably arranged so that the first lead screws 71, 72 are connected to the first support elements 4; 41, and the second lead screws 73, 74 are connected to the second support elements 4; 42. Now both the first and the second lead screws 7; 71, 72, 73, 74 are arranged essentially at the periphery of the cutter, where also the corresponding support elements, such as wheels, rollers or reels, are located. Both the first and the second lead screws 7 are arranged at a distance from each other. Most advantageously said distances correspond to the width of the cutter 3 in a direction perpendicular to the proceeding direction. By operating the first lead screws 71, 72, the first support elements 41 are transferred essentially vertically in relation to the cutter 3, and respectively by operating the second lead screws 73, 74, the second support elements 42 are respectively transferred essentially vertically in relation to the cutter 3.

In an embodiment of the invention according to the drawings, the cutting unit 1 is realized by means of a reel-type cutter 3. Now the cutter 3 is a cutting reel 31 serving as a cutting edge, arranged to rotate around a horizontal axis. The cutting unit 1 can also be realized as a plane-type cutter, where the cutting blade is arranged to rotate around a vertical axis.

A reel-type cutter 3 comprises a cutting reel 31 that is rotated around an essentially horizontal axis, and a counterblade 32 arranged in the immediate vicinity thereof. The counterblade 32 is fitted underneath the cutting reel 31. The cutting reel 31 is rotated by a suitable motor, in this case preferably an electric motor 33. The cutting reel 31 comprises, in a known fashion and arranged on the surface area of a threaded cylindrical frame, such as a reel, roller or the like, a number of flat metal blades that are rectangular in cross-section and are arranged to operate together with the fixed, straight counterblade 32 and to cut the grass, hay or similar low vegetation in the manner of scissors by effective, rotary cutting motions. The distance of the counterblade 32, particularly the distance of its cutting blade edge 32a, from the ground defines the cutting height of grass or vegetation in general (cf. FIG. 4).

In the embodiment according to the drawings, the support elements 4 are realized by means of two support reels 41, 42 that are essentially parallel with the cutting reel 31. Now the first support reel 41 corresponds to the above described first support elements, and the second support reel 42 respectively corresponds to the second support elements. The first support reel 41 is located, in the cutting unit proceeding direction A, in front of it, and the second support reel 42 is located behind it, so that the cutter 3 is left between the support reels 41, 42. The cutting unit 1 is moved in relation to the cutting reel 31 of the cutter 3 and to the counterblade 32 in a perpendicular direction A. The cutting unit 1 is supported against the ground by support reels 41, 42 when using the cutting unit 1.

In the most advantageous embodiment of the invention, the setting device includes first lead screws 7; 71, 72 that are connected to the ends of the first support reel 4; 41, i.e. the front reel, and respectively second lead screws 7; 73, 74 that are connected to the ends of the second support reel 4; 42, i.e. the rear reel. The lengthwise axes of the lead screws 7 are essentially vertical. The first 7; 71, 72 and second 7; 73, 74 lead screws are operated by corresponding first 8; 81, 82 and second 8; 83, 84 nut elements that are fitted in connection with the frame 2 of the cutting unit 1. Each nut element 8; 81, 82, 83, 84 is rotatably attached by a suitable fastening element, such as a fastening sleeve 11; 111, 112, 113, 114 to the frame 2 above the ends of the support elements 4, such as support reels 41, 42. The fastening element, such as a fastening sleeve, allows the rotation of the nut element, but prevents its motion in the direction of the lengthwise axis of the lead screw. The nut element can be suitably articulated to the fastening sleeve or the like.

By operating the lead screws 7 by the nut elements 8, each support reel 4; 41, 42 can be either separately or together transferred, along with the lead screw, in an essentially vertical direction in relation to the frame 2 and simultaneously to the cutter 3, and the cutting height can be set on a suitable predetermined level. The lead screws 7 are provided with a threaded area 7a of a suitable length, and with a thread having a suitable, small angle of thread. The length k of the threaded area in the direction of the lead screw axis is determined according to the traversed path allowed for the lead screw and according to the setting area of the desired cutting height (difference of the maximum and minimum values of the cutting height); in this case they are equal in magnitude, but in general the are directly proportional to each other.

The lead screws 7; 71, 72; 73, 74 connected at the ends of each support reel 4; 41, 42 are most advantageously operated by means of one driving motor, preferably an electric motor, 6; 61, 62. Now the electric motor 6; 61, 62 is connected, by intermediation of suitable power transmission means 9; 91, 92, to the nut elements 8; 81, 82; 83, 84 operating the lead screws 7; 71, 72; 73, 74 of the support element 4; 41; 42. The power transmission means 9 are realized by means of swivel wheels, preferably cogged wheels 12; 121, 122; 13; 131, 132 arranged in connection with endless power transmission means, such as a belt or a chain, preferably a cogged belt, 10; 101, 102, and in connection with the nut elements 8; 81, 82; 83, 84. On the axis of the electric motor 6; 61, 62, there also is arranged a power transmission wheel that is, when using a cogged belt or the like, preferably a cogged wheel 14; 141, 142. Moreover, it is advantageous that in the vicinity of the electric motor, on both sides of the power transmission wheel, there are two pressing wheels 15; 151, 152, 153, 154, by means of which a reliable and effective power transmission is ensured from the electric motor by belt transmission to the nut elements 8; 81, 82; 83, 84 and further to the lead screws 7; 71, 72; 73, 74. The electric motors 6; 61, 62 together with their power transmission means 9; 91, 92 and swivel wheels, such as cogged wheels 12; 121, 122; 13; 131, 132, can be encompassed within a suitable detachable protective casing (not illustrated).

Figure 5:
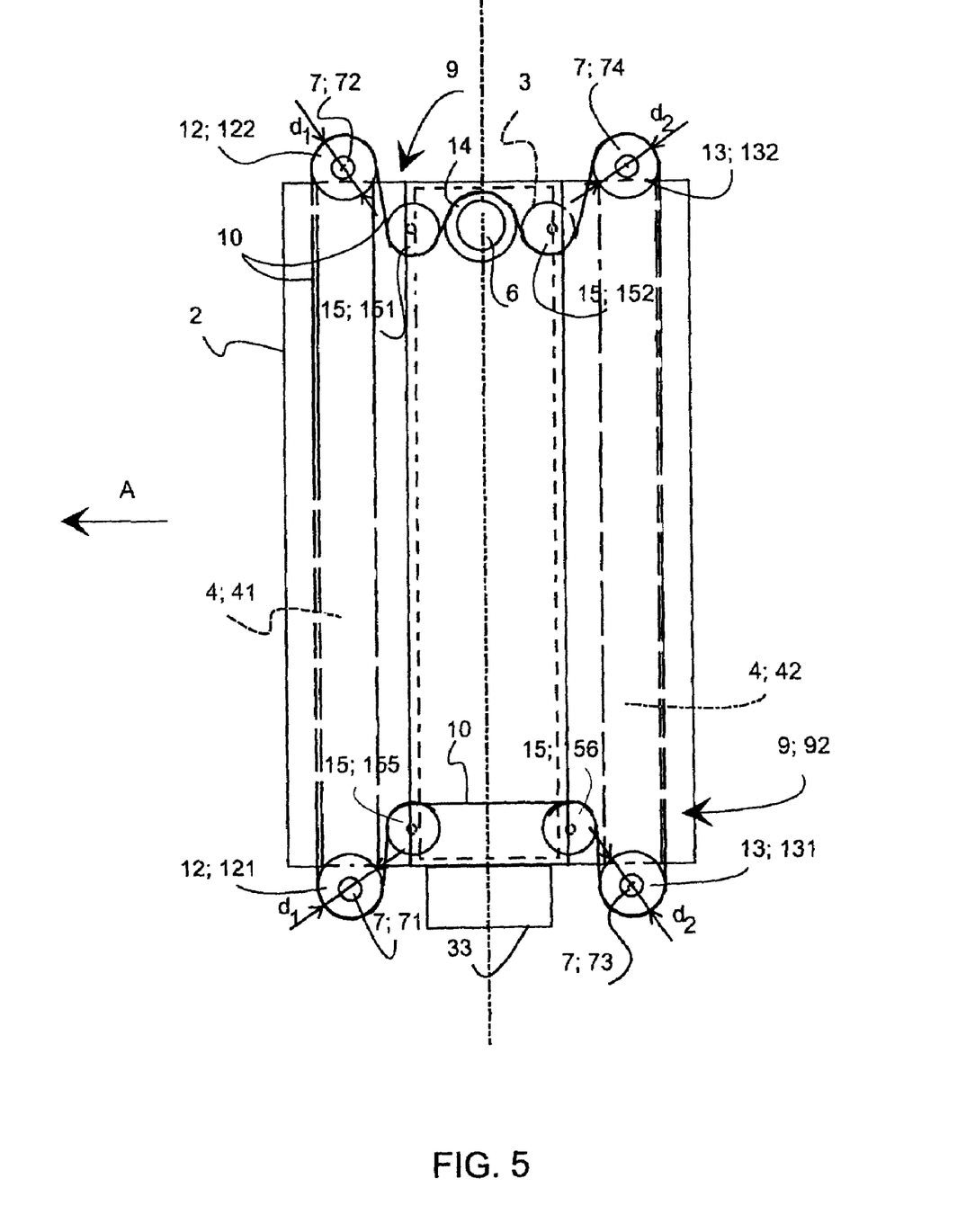
FIG. 5 is a schematical top-view illustration of another cutting unit.

In a preferred alternative embodiment of the invention, the lead screws 7; 71, 72; 73, 74 of both support reels 4; 41, 42 are used only by one driving motor, preferably an electric motor 6, as is illustrated in the cutting unit of FIG. 5. In this case the electric motor 6 is arranged at the other end of the cutting unit 1, between one first 7; 72 and one second 7; 74 lead screw. The power transmission means 9 are realized by means of swivel wheels 12; 13, preferably cogged wheels, arranged in connection with one uniform endless belt 10, preferably a cogged belt, and nut elements. Now the belt 10 is arranged to circulate around all swivel wheels 12, 13 of the nut elements 8. In addition, the first set of pressing wheels 15; 151, 152 affecting the belt 10 are advantageously used on both sides of the electric motor 6 at the end of the cutting unit 1, and in this case also a second set of pressing wheels 15; 154, 155 at the second end of the cutting unit, in the vicinity of the swivel wheels 12; 121, 13; 131, as is illustrated in FIG. 5. By means of the pressing wheels 15 it is ensured that the belt 10 follows closely to the swivel wheels 12, 13 of the nut elements 8; 81, 82, 83, 84.

The diameter $d_1$ of the swivel wheels 12: 121, 122 of the nut elements of the first lead screws 7; 71, 72 of the first support elements 4; 41, and the diameter $d_2$ of the swivel wheels 13; 131, 132 of the nut elements of the second lead screws 7; 73, 74 of the second support elements 4; 42 are different in size. The first transmission ratio between the driving motor 6 and the first lead screws 7; 71, 72 is determined according to the ratio of the diameter d of the swivel wheel 14 of the driving motor 6, preferably a cogged wheel, and the diameters $d_1$ of the swivel wheels 12; 121, 122 provided in connection with the nut elements of the first lead screws 7; 71, 72. The second transmission ratio between the driving motor 6 and the second lead screws 7; 73, 74 is respectively determined by the ratio of the diameter d of the driving motor swivel wheel 14, preferably a cogged wheel, and the diameters $d_2$ of the swivel wheels 13; 131, 132 provided in connection with the nut elements of the second lead screws 7; 73, 74. When the diameters $d_1$, $d2$ of the swivel wheels provided in connection with the nut elements of the first and second lead screws are different in size, then the transmission ratio between the driving motor and the first and respectively the second lead screws also is different.

It is advantageous to arrange the ratio of the diameters of the swivel wheels 13 so that the diameters $d_1$ of the swivel wheels 12 of the first lead screws are somewhat larger than the diameters $d_2$ of the swivel wheels 13 of the second lead screws. Now the rear part of the cutting unit 1 can be raised/lowered by moving the second support elements 4; 42, with a larger marginal than the front part of the cutting unit by moving the first support elements 4; 42. Thus the attack angle α is adjusted to be of the desired order in a predetermined fashion, when the ratio of said diameters $d_1/d_2$ is suitably determined and realized. Consequently, by this arrangement, the attack angle is adjusted in a simple fashion.

In a preferred embodiment of the invention, the electric motor 6; 61, 62 serving as the driving motor is realized as an electrically driven servo motor. This can be easily coupled to a suitable control unit. Adjusted feedback motors are called servo motors. Electrically driven servo motors are direct current (DC) or alternating current (AC) motors, which in this case are connected as part of the cutting unit control and adjusting system.

As an alternative, the driving motor is realized as a hydraulic motor. For cutting grass, the device must in that case be provided with a suitable hydraulic system, to which the cutting height setting motor of the cutting unit is connected. Naturally also the motor driving the cutter is most advantageously realized as a hydraulic motor in this type of cutting unit. In this case the hydraulic motor is preferably a servo motor.

Figure 1:
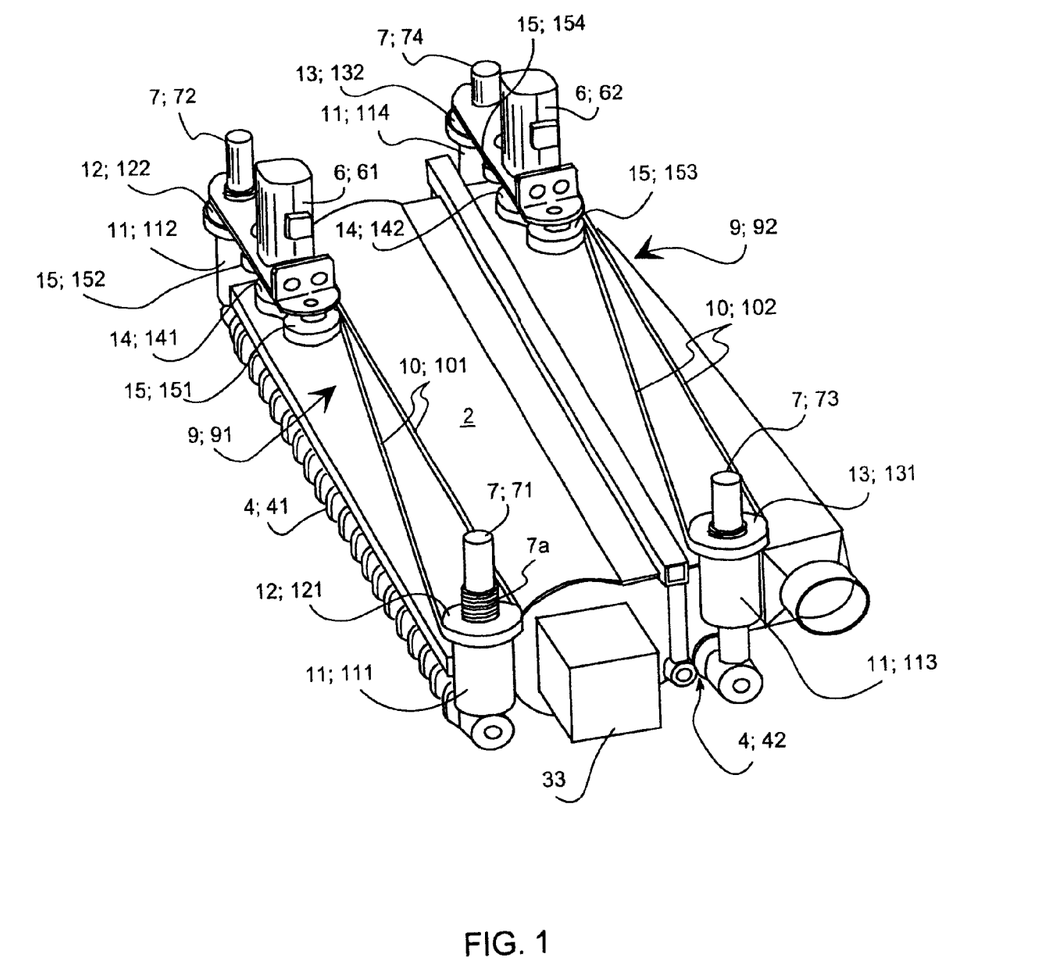
FIG. 1 illustrates a grass cutting unit, seen in a top-view perspective drawing from an oblique angle.
Figure 2:
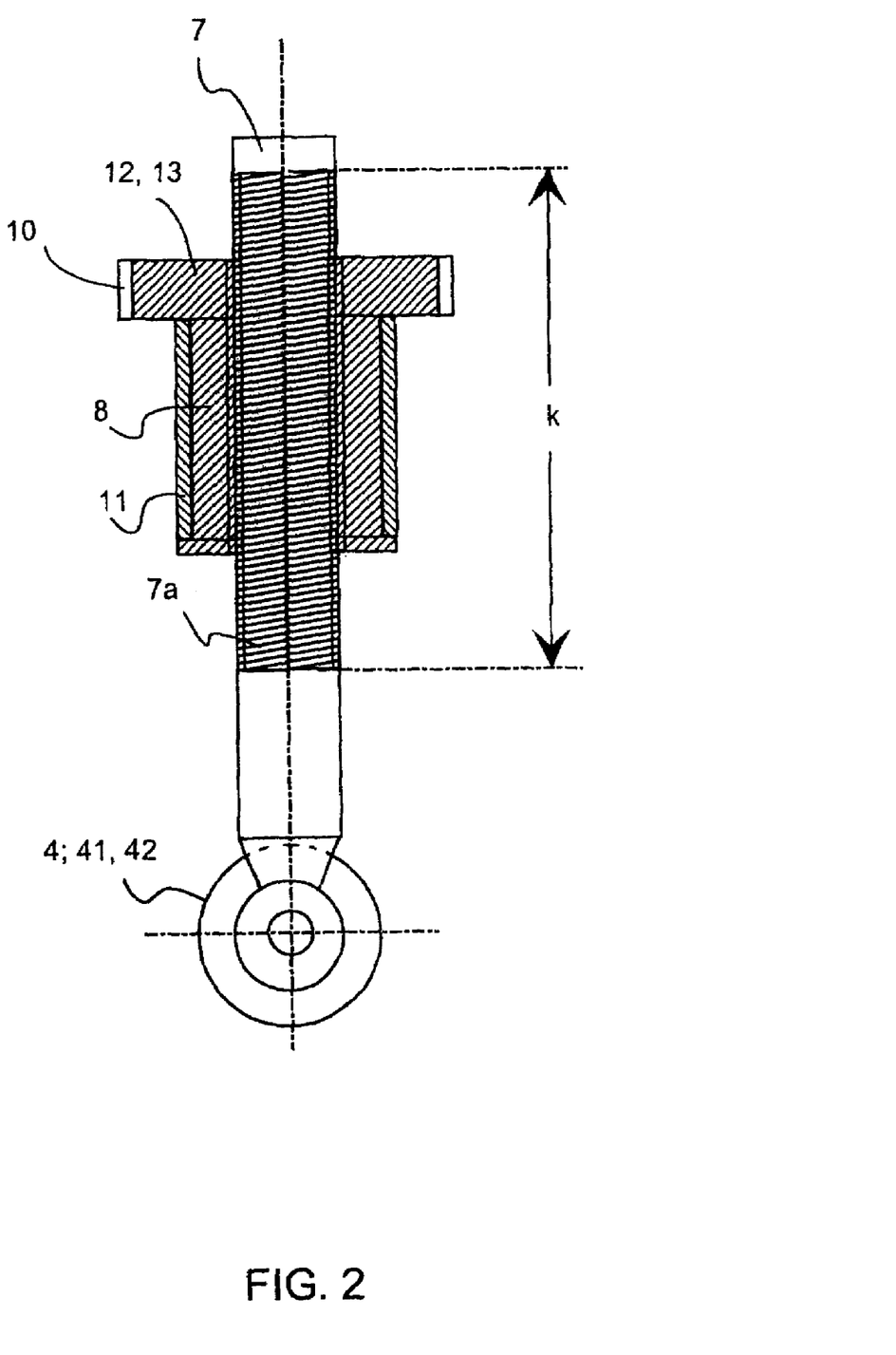
FIG. 2 is a partially cross-sectional side-view illustration of a lead screw and its fastening to the cutting unit frame and to the support element, particularly the support reel.
Figure 3:
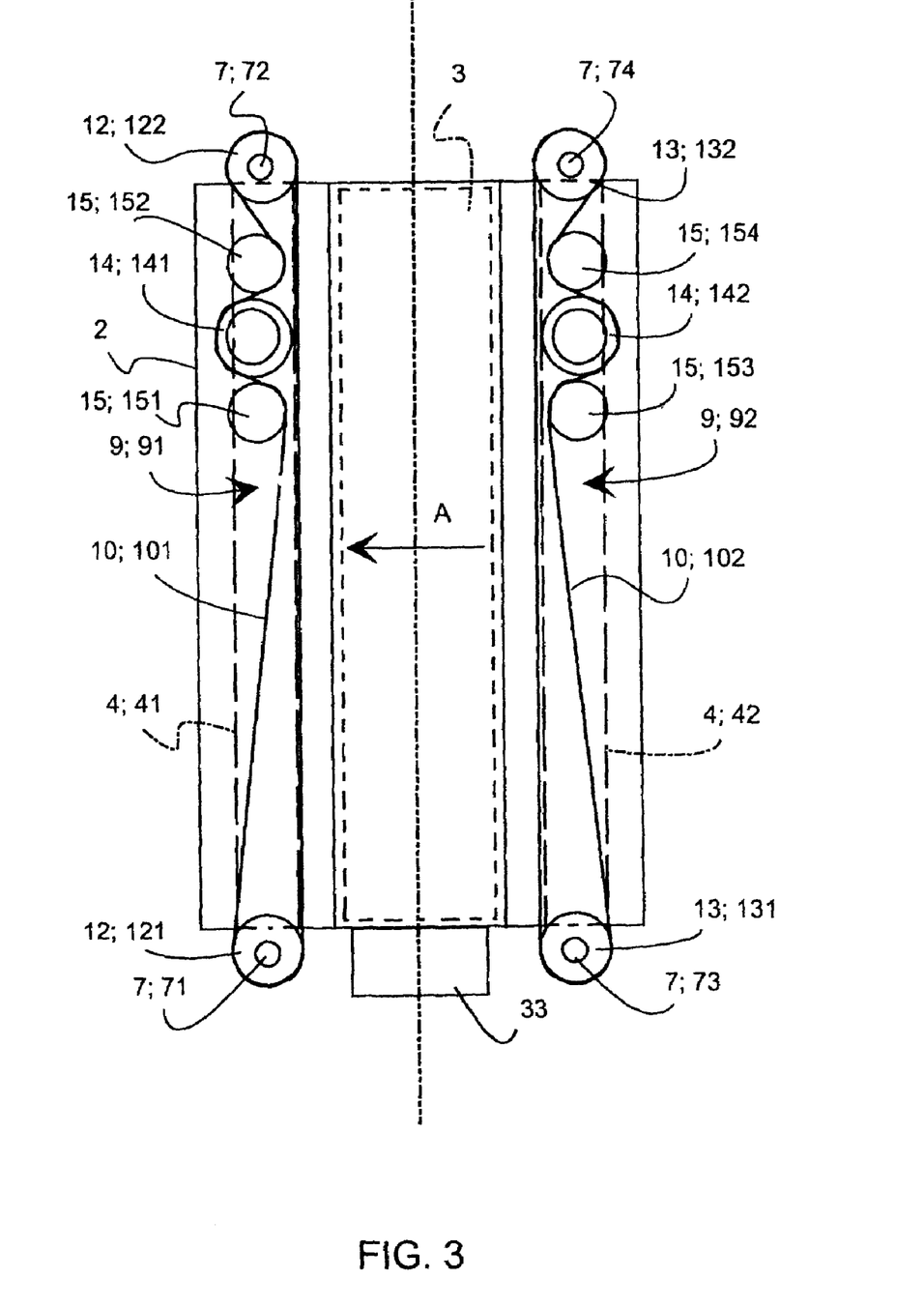
FIG. 3 is a schematical top-view illustration of the cutting unit.
Figure 4:
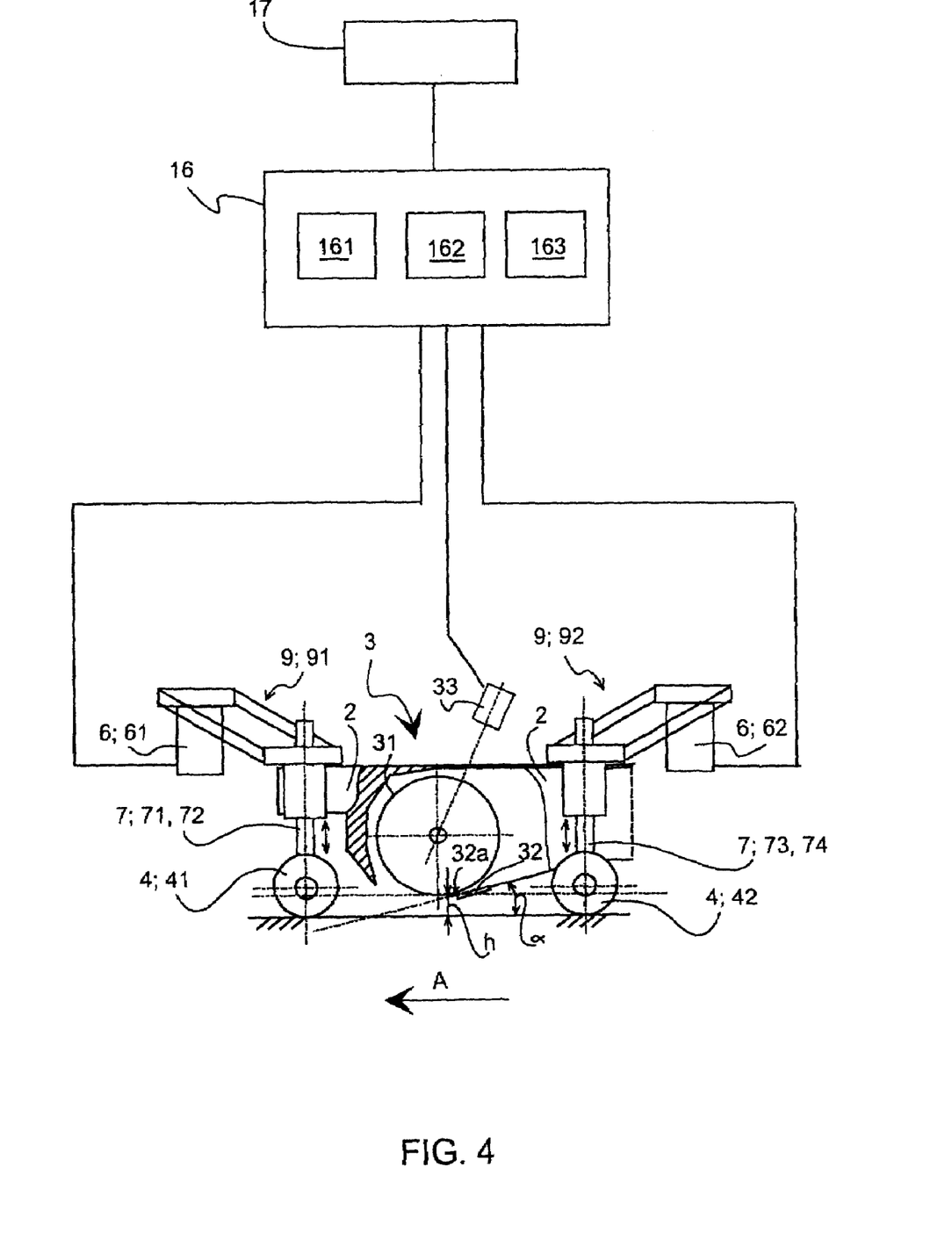
FIG. 4 is a schematical illustration of the cutting unit in partial cross-section and of the control unit of the cutting unit.

In addition, the cutting height setting device 5 includes a control unit 16, as is illustrated in FIG. 4. This can advantageously be realized by means of a microcontroller or a microprocessor, in connection with there are arranged suitable auxiliary units, such as memory, data transmission, data feed and display units.

The control unit 16 includes a cutting height setting unit 161, in which the desired grass cutting height h can be fed by a suitable data feeding device, such as a keypad and/or a touch-sensitive display 17. By means of the control unit 16, the setting of the cutting height h of the cutting unit 1 is performed by adjusting the position of the support elements 4; 41, 42 in relation to the ground surface, and simultaneously in relation to the cutter 3, by suitably operating the lead screws 7; 71, 72; 73, 74 by using the driving motors 6; 61, 62. When the employed driving motor is particularly an electric servo motor 6, from the motor there is directly obtained the position data of the axis and also of the one or several lead screws 7 connected thereto, and particularly the rotations per minute readings, on the basis of which, together with the lead screw thread angle, there are defined the realized transfer paths of both the lead screw and of the corresponding support elements.

Most advantageously the control unit 16 also is provided with a cutting height calibration unit 162, whereby the reference height $h_{ref}$ is recorded in the memory unit of a suitable control unit 16. The reference height $h_{ref}$ corresponds to a given predetermined cutting height in a given position of the lead screws 7. When calibrating the cutting height, the cutter 3 of the cutting unit 1 is driven to the set reference height $h_{ref}$, which is checked manually for example by a suitable measurement rod. A possible deviation is registered and fed, as a correction value of the reference height $h_{ref}$, to the control unit 16, particularly to its calibration unit 162. After calibration, the desired cutting height h is set with respect to the reference height $h_{ref}$ by adding or reducing therefrom for example a given step value of the height, such as 5 mm, as one or several multifolds, or alternatively by floating between the maximum and minimum height values, for example within the range 1-50 mm, to the desired cutting height fed into the control unit 16.

The control unit 16 is advantageously also provided with an attack angle setting unit 163. This is the case particularly when the first 71, 72 and second 73, 74 lead screws of the first 41 and second support elements 42, such as support reels, are used separately by their own driving motors 61, 62, and the support elements are thus separately adjustable. The desired attack angle α can be fed in this unit 163, or it is automatically adjustable according to the cutting height table recorded in the memory unit. By means of the attack angle setting unit 163, there is performed the setting of the attack angle α by adjusting the relative position of the first and second support elements, such as the first and second support reel 4; 41, 42, by means of the driving motors 6; 61, 62 by operating the lead screws 7; 71, 72; 73, 74.

The control unit 16 is preferably realized so that it is used for adjusting and controlling the operation of one or several cutting units 1 in general, and thus not only the cutting height setting devices 5 belonging thereto. Consequently, also the operation of the cutter 3, particularly of the motor 33, is controlled and monitored by means of the control unit 16.

The invention is not restricted to the above described embodiments only, but many modifications are possible within the scope of the inventive idea defined in the appended claims.

The invention claimed is:

1. A grass cutting unit (1) comprising:
   a frame (2);
   a cutter (3) located in connection with said frame, the cutter (3) for cutting grass;
   support elements (4; 41, 42) for supporting the cutting unit (1) against the ground; and
   a cutting height setting device comprising
   i) lead screws (7; 71, 72, 73, 74) functionally arranged between the frame (2) and the support elements (4; 41, 42),
   ii) rotatable nut elements (8; 81, 82; 83, 84) provided in connection with the frame and with the lead screws,
   iii) at least one driving motor (6; 61, 62), and
   iv) a power transmission means (9; 91, 92) arranged between the at least one driving motor and the rotatable nut elements so that the at least one driving motor (6; 61; 62) is connected, by intermediation of the power transmission means (9; 91, 92), to the rotatable nut elements (8; 81, 82; 83, 84),
   said driving motor configured to operate the lead screws (7; 71, 72; 73, 74) so that by rotating the nut elements, the lead screws are operated and the position of the support elements with respect to the cutter, as well as the cutting height (h), is adjustable within the desired limits.

2. A cutting unit (1) according to claim 1, wherein each nut element (8; 81, 82, 83, 84) is rotatably attached by a fastening element to the frame (2) above the support elements (4; 41, 42).

3. A cutting unit (1) according to claim 1, wherein the power transmission means (9) comprise swivel wheels (12;

121, 122; 13; 131, 132) arranged in connection with an endless power transmission element, and the nut elements (8; 81, 82; 83, 84).

4. A cutting unit (1) according to claim 1, wherein the cutting height setting device also includes a control unit (16) provided with a cutting height setting unit (161), in which the desired grass cutting height (h) can be fed, and which performs the setting of the cutting height of the cutting unit (1) by adjusting the position of the support elements (4; 41, 42) by means of the at least one driving motor (6; 61, 62), by using the nut elements (8; 81, 82; 83, 84) and the lead screws (7; 71, 72; 73, 74).

5. A cutting unit (1) according to claim 1, wherein
first ones of the support elements (4; 41) are arranged, in a transfer direction (A), at a front side of the cutter (3),
second ones of the support elements (4; 42) are arranged at a rear side of the cutter,
the lead screws (7) are arranged in two groups to define first and second lead screws, of which the first lead screws (7; 71, 72) are connected to the first ones of the support elements (4; 41), and the second lead screws (7; 73, 74) are connected to the second ones of the support elements (4; 42), and
the cutting height setting device comprises exactly one driving motor (6) that is connected, by intermediation of the power transmission means (9), to the first and second nut elements (8; 81, 82; 83, 84) operating the lead screws (7; 71, 72; 73, 74) of the first and second support elements (41; 42).

6. A cutting unit according to claim 5, wherein the transmission ratio of the power transmission means (9) is different between the driving motor (6) and the first nut elements (8; 81, 82) of the first lead screws (7; 71, 72) of the first support elements (41) and respectively between the driving motor and the second nut elements (8; 83, 84) of the second lead screws (7; 73, 74) of the second support elements (42).

7. A cutting unit according to claim 5, wherein the diameter ($d_1$) of the swivel wheels (12; 121, 122) arranged in connection with the nut elements (8; 81, 82) of the first lead screws (7; 71, 72) of the first support elements and the diameter ($d_2$) of the swivel wheels of the nut elements (8; 83, 84) of the lead screws (7; 73, 74) of the second support elements are different in size.

8. A cutting unit according to claim 5, wherein the first (7; 71, 72) and second (7; 73, 74) lead screws are provided with different thread angles.

9. A cutting unit (1) according to claim 1, wherein
first ones of the support elements (4; 41) are arranged, in a transfer direction (A), at a front size of the cutter (3),
second ones of the support elements (4; 42) are arranged at a rear side of the cutter,
the cutting height setting device comprises two driving motors (6; 61, 62), of which the first driving motor (61) is connected, by intermediation of the first power transmission means (91) to the first nut elements (8; 81, 82) operating the first lead screws (7; 71, 72) of the first support elements (41), and respectively the second driving motor (6; 62) is connected, by intermediation of the power transmission means (9; 92), to the second nut elements (8; 83, 84) operating the second lead screws (7; 73, 74) of the second support elements (4; 42).

10. A cutting unit (1) according to claim 9, wherein the control unit (16) is provided with an attack angle setting unit (162), in which the size of the desired attack angle (α) can be fed and which performs the setting of the attack angle by adjusting the relative position of the first and second support elements (4; 41, 42) by means of the driving motors (6; 61, 62), by operating the lead screws (7; 71, 72; 73, 74).

11. A cutting unit according to claim 4, wherein the control unit (16) is provided with a cutting height calibration unit (162), by means of which in a memory of the control unit, there is set a reference height ($h_{ref}$) corresponding to a given predetermined cutting height in a given driving position of the driving motors.

12. A cutting unit (1) according to claim 5, the cutter (3) comprises an essentially horizontally rotatable cutting reel (31) and a counterblade (32), the first and second support elements (4) of the cutting unit (1) comprising a support reel (41, 42) of essentially the same length as the cutting unit, said support elements being arranged, in the transfer direction, at the front and rear sides of the cutter, essentially in parallel therewith, the first lead screws (7; 71, 72) are connected to the ends of the first support element (4; 41), and respectively the second lead screws (7; 73, 74) are connected to the ends of the second support element (4; 42), and the corresponding nut elements (8; 81, 82; 83, 84) are connected to the frame (2), in order to make each support element movable essentially vertically by rotating the lead screws.

13. A cutting unit (1) according to claim 1, wherein the driving motor (6; 61, 62) is an electric motor.

14. A cutting unit (1) according to claim 2, wherein the power transmission means (9) comprise swivel wheels (12; 121, 122; 13; 131, 132) arranged in connection with an endless power transmission element and the nut elements (8; 81, 82; 83, 84).

15. A cutting unit (1) according to claim 2, wherein the cutting height setting device also includes a control unit (16) provided with a cutting height setting unit (161), in which the desired grass cutting height (h) can be fed, and which performs the setting of the cutting height of the cutting unit (1) by adjusting the position of the support elements (4; 41, 42) by means of the at least one driving motor (6; 61, 62), by using the nut elements (8; 81, 82; 83, 84) and the lead screws (7; 71, 72; 73, 74).

16. A cutting unit (1) according to claim 2, wherein,
first ones of the support elements (4; 41) are arranged, in a transfer direction (A), at a front side of the cutter (3),
second ones of the support elements (4; 42) are arranged at a rear side of the cutter,
the lead screws (7) are arranged in two groups to define first and second lead screws, of which the first lead screws (7; 71, 72) are connected to the first ones of the support elements (4; 41), and the second lead screws (7; 73, 74) are connected to the second ones of the support elements (4; 42), and
the cutting height setting device comprises exactly one driving motor (6) that is connected, by intermediation of the power transmission means (9), to the first and second nut elements (8; 81, 82; 83, 84) operating the lead screws (7; 71, 72; 73, 74) of the first and second support elements (41; 42).

17. A cutting unit according to claim 6, wherein the diameter ($d_1$) of the swivel wheels (12; 121, 122) arranged in connection with the nut elements (8; 81, 82) of the first lead screws (7; 71, 72) of the first support elements and the diameter ($d_2$) of the swivel wheels of the nut elements (8; 83, 84) of the lead screws (7; 73, 74) of the second support elements are different in size.

18. A cutting unit (1) according to claim 3, wherein
first ones of the support elements (4; 41) are arranged, in a transfer direction (A), at a front side of the cutter (3),
second ones of the support elements (4; 42) are arranged at a rear side of the cutter, the lead screws (7) are arranged in two groups to define first and second lead screws, of which the first lead screws (7; 71, 72) are connected to the first ones of the support elements (4; 41), and the second lead screws (7; 73, 74) are connected to the second ones of the support elements (4; 42), and the cutting height setting device comprises exactly one driving motor (6) that is connected, by intermediation of the power transmission means (9), to the first and second nut elements (8; 81, 82; 83, 84) operating the lead screws (7; 71, 72; 73, 74) of the first and second support elements (41; 42).

19. A cutting unit according to claim 5, wherein the control unit (16) is provided with a cutting height calibration unit (162), by means of which in a memory of the control unit, there is set a reference height ($h_{ref}$) corresponding to a given predetermined cutting height in a given driving position of the driving motors.

20. A grass cutting unit (1) comprising:
- a frame (2);
- a grass cutter (3) located in connection with said frame, the cutter (3) for cutting grass;
- wheels (4) connected to the frame and supporting the frame against the ground; and
- a cutting height setting device comprising
  - i) a drive motor (6);
  - ii) lead screws (7) fitted between the frame (2) and the wheels (4),
  - iii) rotatable nut elements (8) provided in connection with the frame and with the lead screws, each nut element rotatable to operate a corresponding one of the lead screws, each nut element surrounding the corresponding one of the lead screws,
  - iv) a power transmission means (9) connecting the driving motor to the rotatable nut elements (8), the power transmission means arranged between the driving motor and the rotatable nut elements so that the driving motor is connected, by intermediation of the power transmission means, to the rotatable nut elements (8),
- said driving motor configured to drive the power transmission means so that the power transmission means rotates the nut elements, and the thus caused rotation of the nut elements in turn causes movement of the lead screws that changes a cutting height (h) position of the wheels with respect to the cutter.

* * * * *